United States Patent
Kang et al.

(10) Patent No.: US 12,410,353 B2
(45) Date of Patent: Sep. 9, 2025

(54) MIXED REFRIGERANT COMPOSITION AND HEAT PUMP INCLUDING THE SAME

(71) Applicants: SK INNOVATION CO., LTD., Seoul (KR); SK Enmove Co., Ltd., Seoul (KR)

(72) Inventors: Bong Ho Kang, Daejeon (KR); Hye Ri Kim, Daejeon (KR); Ji Seong Noh, Daejeon (KR); Sang Gu Woo, Daejeon (KR); Jae Min Lee, Daejeon (KR)

(73) Assignees: SK INNOVATION CO., LTD., Seoul (KR); SK ENMOVE CO., LTD., Seoul (KR)

( * ) Notice: Subject to any disclaimer, the term of this patent is extended or adjusted under 35 U.S.C. 154(b) by 0 days.

(21) Appl. No.: 18/806,700

(22) Filed: Aug. 16, 2024

(65) Prior Publication Data

US 2025/0059422 A1    Feb. 20, 2025

(51) Int. Cl.
*C09K 5/04* (2006.01)

(52) U.S. Cl.
CPC ........ *C09K 5/045* (2013.01); *C09K 2205/126* (2013.01)

(58) Field of Classification Search
CPC ....................................................... C09K 5/045
See application file for complete search history.

(56) References Cited

U.S. PATENT DOCUMENTS

| | | |
|---|---|---|
| 2022/0214085 A1 | 7/2022 | Kumakura et al. |
| 2022/0348810 A1 | 11/2022 | Itano et al. |

FOREIGN PATENT DOCUMENTS

| | | | |
|---|---|---|---|
| CN | 110317574 A | 10/2019 | |
| CN | 113980649 A | 1/2022 | |
| EP | 3299435 A1 * | 3/2018 | ........... A62D 1/0057 |
| KR | 10-2020-0089295 A | 7/2020 | |
| KR | 10-2020-0108245 A | 9/2020 | |
| KR | 10-2021-0089167 A | 7/2021 | |
| KR | 10-2022-0137896 A | 10/2022 | |
| WO | 2022/017109 A1 | 1/2022 | |

OTHER PUBLICATIONS

Extended European Search Report for the European Patent Application No. 24194660.7 issued by the European Patent Office on Jan. 16, 2025.
International Search Report for International Patent Application No. PCT/KR2024/096014 issued by the International Searching Authority on Nov. 21, 2024.

* cited by examiner

*Primary Examiner* — Peter F Godenschwager
(74) *Attorney, Agent, or Firm* — IP & T GROUP LLP

(57) ABSTRACT

A mixed refrigerant composition includes carbon dioxide (R-744), 2,3,3,3-tetrafluoropropene (R-1234yf) and trifluoroiodomethane (R-13I1). A content of the carbon dioxide (R-744) ranges from 1 to 10 wt. % based on a total weight of the mixed refrigerant composition, and a sum of a content of the 2,3,3,3-tetrafluoropropene (R-1234yf) and a content of the trifluoroiodomethane (R-13I1) ranges from 90 to 99 wt. % based on the total weight of the mixed refrigerant composition. A boiling point at 1 atm of the mixed refrigerant composition ranges from −76 to −35° C.

13 Claims, 1 Drawing Sheet

MIXED REFRIGERANT COMPOSITION AND HEAT PUMP INCLUDING THE SAME

CROSS REFERENCE TO RELATED APPLICATION

The present application claims priority under 35 U.S.C. § 119(a) to Korean patent application number 10-2023-0106987 filed on Aug. 16, 2023, and to Korean patent application number 10-2024-0094666 filed on Jul. 17, 2024, the entire disclosure of which is incorporated by reference herein.

BACKGROUND OF THE INVENTION

1. Field of the Invention

The present invention relates to a composition operable as a refrigerant, and a heat pump including the same.

2. Description of the Related Art

Refrigerants are substances used to remove heat from heat pumps utilized in air conditioners, refrigerators, cooling towers and the like. The refrigerants may include, for example, natural refrigerants, chlorofluorocarbon (CFC)-based refrigerants, hydrochlorofluorocarbon (HCFC)-based refrigerants, hydrofluorocarbon (HFC)-based refrigerants, and hydrofluoroolefm (HFO)-based refrigerants.

Recently, types of heat pumps used indoors and outdoors have become more diverse, and due to the development of electric vehicles, etc., the miniaturized heat pumps are required. Further, in the case of refrigerants containing chlorine (Cl), these refrigerants may cause ozone layer destruction, etc., such that the development of refrigerants which do not contain chlorine atoms is underway.

For example, 2,3,3,3-tetrafluoropropane (R-1234yf) which is a type of hydrofluoroolefm-based refrigerant does not contain chlorine atoms. Therefore, this substance is actively used as a refrigerant in air conditioners for a vehicles due to a low global warming potential (GWP).

However, when 2,3,3,3-tetrafluoropropene is used as a refrigerant in the air conditioners for vehicles due to its low coefficient of performance (COP), there is a problem that the performance of the air conditioners is decreased since an additional heat pump is required.

Therefore, there is a need to develop a refrigerant or combination of refrigerants which have a high coefficient of performance while capable of suppressing environmental pollution.

SUMMARY OF THE INVENTION

One of the various embodiments of the present disclosure provides a mixed refrigerant composition with improved environmental friendliness.

Other of the various embodiments of the present disclosure provides a heat pump which includes the mixed refrigerant composition, and has improved cooling performance.

According to one aspect of the present disclosure, there is provided a mixed refrigerant composition including carbon dioxide (R-744), 2,3,3,3-tetrafluoropropene (R-1234yf) and trifluoroiodomethane (R-13I1), wherein a content of the carbon dioxide (R-744) ranges from 1 to 10% by weight based on a total weight of the mixed refrigerant composition, a sum of a content of the 2,3,3,3-tetrafluoropropene (R-1234yf) and a content of the trifluoroiodomethane (R-13I1) ranges from 90 to 99% by weight based on the total weight of the mixed refrigerant composition, and a boiling point of the mixed refrigerant composition at 1 atm ranges from −76 to −35° C.

The mixed refrigerant composition according to various embodiments of the present disclosure consist of the carbon dioxide (R-744), the 2,3,3,3-tetrafluoropropene (R-1234yf) and the trifluoroiodomethane (R-13I1).

In some embodiments, the content of the 2,3,3,3-tetrafluoropropene (R-1234yf) based on the total weight of the mixed refrigerant composition may be greater than the content of the trifluoroiodomethane (R-13I1).

In some embodiments, the content of the 2,3,3,3-tetrafluoropropene (R-1234yf) may range from 45 to 95% by weight based on the total weight of the mixed refrigerant composition.

In some embodiments, the content of the trifluoroiodomethane (R-13I1) may range from 5 to 49% by weight based on the total weight of the mixed refrigerant composition.

In some embodiments, a ratio of the content of the 2,3,3,3-tetrafluoropropene (R-1234yf) to the content of the carbon dioxide (R-744) based on the total weight of the mixed refrigerant composition may range from 3 to 90.

In some embodiments, a ratio of the content of the trifluoroiodomethane (R-13I1) based on the total weight of the mixed refrigerant composition to the content of the carbon dioxide (R-744) based on the total weight of the mixed refrigerant composition may range from 0.1 to 60.

In some embodiments, a critical temperature of the mixed refrigerant composition may range from 95 to 110° C.

In some embodiments, a critical pressure of the mixed refrigerant composition may range from 35 to 55 bar.

In some embodiments, a temperature glide at a pressure of 1.5 bar of the mixed refrigerant composition may range from 5 to 45° C.

In some embodiments, a temperature glide at a pressure of 15 bar of the mixed refrigerant composition may range from 1 to 40° C.

In some embodiments, a latent heat at −25° C. of the mixed refrigerant composition may range from 100 to 200 kJ/kg.

In some embodiments, a global warming potential (GWP) of the mixed refrigerant composition may range from 1 to 5.

According to another aspect of the present disclosure, there is provided a heat pump operable with the mixed refrigerant composition according to the embodiments of the present disclosure.

According to another aspect of the present disclosure, there is provided a mixed refrigerant composition comprising: a natural refrigerant and a mixture of two or more artificial refrigerants, the artificial refrigerants having a zero ozone depleting potential and a global warming potential of less than 5. The mixed refrigerant composition includes no chlorine. A content of the natural refrigerant ranges from 1 to 10% by weight based on a total weight of the mixed refrigerant composition, a sum of a content of the two artificial refrigerants ranges from 90 to 99% by weight based on the total weight of the mixed refrigerant composition, and a boiling point for the mixed refrigerant composition at 1 atm ranges from −76 to −35° C.

In some embodiments, the natural refrigerant comprises at least one or more of ammonia, carbon dioxide, propane, propylene, and butane.

In some embodiments, the artificial refrigerants comprise hydrofluorocarbon (HFC)-based refrigerants and hydrofluoroolefm (HFO)-based refrigerants. In the mixed refrigerant composition according to various embodiments of the present disclosure, the refrigerant included in the mixed refrigerant composition may not contain chlorine atoms (Cl), thus environmental pollution such as ozone layer destruction can be suppressed.

The mixed refrigerant composition according to various embodiments of the present disclosure may effectively decrease the ambient temperature during vaporization from liquid to gas even at a low temperature.

In addition, the mixed refrigerant composition may not be phase converted to a supercritical state while a cooler such as an air conditioner is operated. Accordingly, the condensation pressure of the compressor may not be reduced, and the coefficient of performance of a heat pump including the mixed refrigerant composition may be improved, resulting in lower power consumption.

BRIEF DESCRIPTION OF THE DRAWINGS

The above and other features and other advantages of the present disclosure will be more clearly understood from the following detailed description taken in conjunction with the accompanying drawings, in which.

DETAILED DESCRIPTION OF THE INVENTION

According to various embodiments of the present disclosure, a mixed refrigerant composition including carbon dioxide (R-744), 2,3,3,3-tetrafluoropropene (R-1234yf) and trifluoroiodomethane (R-13I1), and a heat pump operable with the mixed refrigerant composition are provided.

Hereinafter, the present disclosure will be described in detail. However, the embodiments are merely illustrative and the present disclosure is not limited to the specific embodiments described by way of the examples given below.

According to various embodiments of the present disclosure, refrigerants included in the mixed refrigerant composition may be refrigerants which do not contain chlorine atoms (Cl). Examples of the refrigerants which do not contain chlorine atoms (Cl) may include natural refrigerants, hydrofluorocarbon (HFC)-based refrigerants, and hydrofluoroolefm (HFO)-based refrigerants.

The natural refrigerant is a substance that exists naturally on earth rather than as an artificial compound. For example, the natural refrigerant may include at least one of ammonia (R-717), carbon dioxide (R-744), propane (R-290), propylene (R-1270) and butane (R-600a).

The hydrofluorocarbon (HFC)-based refrigerant is a refrigerant composed of hydrogen atoms (H), fluorine atoms (F) and carbon atoms (C). The hydrofluorocarbon (HFC)-based refrigerant may include, for example, at least one or more of difluoromethane (R-32), trifluoroiodomethane (R-13I1), 1,1-difluoroethane (R-152a), pentafluoroethane (R-125), 1,1,1-trifluoroethane (R-143a), trifluoromethane (R-23), fluoroethane (R-161), 1,1,1,2,3,3,3-heptafluoropropane (R-227ea), 1,1,1,2,3,3-hexafluoropropane (R-236ea), 1,1,1,3,3,3-hexafluoropropane (R-236fa), 1,1,1,3,3-pentafluoropropane (R-245fa) and 1,1,1,3,3-pentafluorobutane (R-365mfc).

The hydrofluoroolefm (HFO)-based refrigerant is a refrigerant composed of hydrogen atoms (H), fluorine atoms (F) and carbon atoms (C), and has at least one double bond between the carbon atoms. The hydrofluoroolefm (HFO)-based refrigerant may include, for example, at least one or more of 1,1,2-trifluoroethylene (R-1123), 2,3,3,3-tetrafluoropropene (R-1234yf), 1,3,3,3-tetrafluoropropene (R-1234ze), 1,2,3,3-tetrafluoropropene (R-1234ye), 3,3,3-trifluoropropene (R-1243zf), 1,1-difluoroethylene (R-1132a) and 1,2,3,3,3-pentafluoropropene (R-1225ye).

The mixed refrigerant composition according to various embodiments of the present disclosure includes carbon dioxide (R-744), 2,3,3,3-tetrafluoropropene (R-1234yf) and trifluoroiodomethane (R-13I1). The carbon dioxide (R-744), the 2,3,3,3-tetrafluoropropene (R-1234yf) and the trifluoroiodomethane (R-13I1) included in the mixed refrigerant composition do not contain chlorine atoms (Cl).

The carbon dioxide (R-744) is a type of the natural refrigerant, and has an ozone depleting potential (ODP) of 0 and a global warming potential (GWP) of 1. In addition, the carbon dioxide (R-744) is not be corrosive, toxic, or explosive. Due to the carbon dioxide (R-744) included in the mixed refrigerant composition, the environmental friendliness and stability of the mixed refrigerant composition may be improved.

The 2,3,3,3-tetrafluoropropene (R-1234yf) is a type of hydrofluoroolefm (HFO)-based refrigerant, and has an ozone depleting potential (ODP) of 0 and a global warming potential (GWP) of 4 or less. In addition, R-1234yf has a high thermal stability and a high evaporative latent heat. As the 2,3,3,3-tetrafluoropropene (R-1234yf) is included in the mixed refrigerant composition, the environmental friendliness, thermal stability and refrigeration capacity of the mixed refrigerant composition may be improved.

The trifluoroiodomethane (R-13I1) is a type of hydrofluorocarbon (HFC)-based refrigerant, and has an ozone depleting potential (ODP) of 0 and a global warming potential (GWP) of less than 5. In addition, the trifluoroiodomethane (R-13I1) has high thermal and chemical stabilities. As the trifluoroiodomethane (R-13I1) is included in the mixed refrigerant composition, the environmental friendliness and stability of the mixed refrigerant composition may be improved.

In some embodiments of the present disclosure, the mixed refrigerant composition may not be mixed with any refrigerant other than the carbon dioxide (R-744), 2,3,3,3-tetrafluoropropene (R-1234yf) and trifluoroiodomethane (R-13I1). For example, the mixed refrigerant composition may not include an additional hydrofluorocarbon (HFC)-based refrigerant such as difluoromethane (R-32) having a high global warming potential. Accordingly, the environmental friendliness of the mixed refrigerant composition may be improved. For example, the mixed refrigerant composition may not include an additional hydrofluoroolefm (HFO)-based refrigerant such as 1,1-difluoroethylene (R-1132a) having toxicity to humans. Thereby, even if some of the mixed refrigerant composition flows out from the heat pump, the impact to the environment is minimal.

In one embodiment, the mixed refrigerant composition consists only of carbon dioxide (R-744), 2,3,3,3-tetrafluoropropene (R-1234yf) and trifluoroiodomethane (R-13I1). Accordingly, it is possible to prevent the thermal and chemical stabilities of the mixed refrigerant composition from being reduced due to the refrigerant having a low thermal or chemical stability mixed therewith. In addition, it is possible to prevent the condensation temperature from being increased due to the refrigerant having a low vapor pressure mixed therewith, or the refrigeration capacity from being reduced due to the refrigerant having a low evaporative latent heat mixed therewith.

According to various embodiments of the present disclosure, a content of the carbon dioxide (R-744) may range from 1 to 10% by weight ("wt. %"), 2 to 10 wt. %, or 3 to 10 wt. %, or may range from 4 to 10 wt. % based on a total weight of the mixed refrigerant composition. If the content of the carbon dioxide (R-744) is less than 1 wt. % based on the total weight of the mixed refrigerant composition, the refrigeration capacity of the mixed refrigerant composition may be reduced. If the content of the carbon dioxide (R-744) exceeds 10 wt. % based on the total weight of the mixed refrigerant composition, temperature and pressure at an outlet of the heat pump, which will be described below, may be increased thus causing a reduction in durability and performance. Accordingly, within the above content range, cooling characteristics of the mixed refrigerant composition may be improved.

In some embodiments of the present disclosure, the content of the carbon dioxide (R-744) may range from 5 to 10 wt. %, 6 to 10 wt. %, or 8 to 10 wt. % based on the total weight of the mixed refrigerant composition. Within the above content range, the environmental friendliness of the mixed refrigerant composition may be further improved.

In various embodiments of the present disclosure, a sum of the content of the 2,3,3,3-tetrafluoropropene (R-1234yf) and the content of the trifluoroiodomethane (R-13I1) may range from 90 to 99 wt. %, 90 to 98 wt. %, 90 to 97 wt. %, or 90 to 96 wt. % based on the total weight of the mixed refrigerant composition. If the sum of the content of the 2,3,3,3-tetrafluoropropene (R-1234yf) and the content of the trifluoroiodomethane (R-13I1) is less than 90 wt. % based on the total weight of the mixed refrigerant composition, the vapor pressure of the mixed refrigerant composition may be increased thus to cause reduction in the refrigeration capacity. If the sum of the content of the 2,3,3,3-tetrafluoropropene (R-1234yf) and the content of the trifluoroiodomethane (R-13I1) exceeds 99 wt. % based on the total weight of the mixed refrigerant composition, the refrigeration capacity of the mixed refrigerant composition may be reduced. Within the above content range, the thermal and chemical stabilities, environmental friendliness, and refrigeration capacity of the mixed refrigerant composition may be improved.

In some embodiments of the present disclosure, the sum of the content of the 2,3,3,3-tetrafluoropropene (R-1234yf) and the content of the trifluoroiodomethane (R-13I1) may range from 90 to 95 wt. %, 90 to 94 wt. %, or 90 to 92 wt. % based on the total weight of the mixed refrigerant composition. Within the above content range, the environmental friendliness and refrigeration capacity of the mixed refrigerant composition may be further improved.

In some embodiments of the present disclosure, the content of the 2,3,3,3-tetrafluoropropene (R-1234yf) based on the total weight of the mixed refrigerant composition may be greater than the content of the trifluoroiodomethane (R-13I1). Accordingly, the chemical stability of the mixed refrigerant composition is improved, as well as the refrigeration capacity by the 2,3,3,3-tetrafluoropropene (R-1234yf) may be improved together.

In some embodiments of the present disclosure, the content of the 2,3,3,3-tetrafluoropropene (R-1234yf) may range from 10 to 98 wt. %, 20 to 98 wt. %, 30 to 98 wt. %, 40 to 98 wt. %, or 45 to 98 wt. % based on the total weight of the mixed refrigerant composition. Within the above content range, the thermal stability and refrigeration capacity of the mixed refrigerant composition may be improved.

In one embodiment of the present disclosure, the content of the 2,3,3,3-tetrafluoropropene (R-1234yf) may range from 45 to 95 wt. %, 45 to 90 wt. %, 50 to 90 wt. %, or 50 to 85 wt. %, or 50 to 80 wt. % based on the total weight of the mixed refrigerant composition. Within the above content range, the thermal stability and refrigeration capacity of the mixed refrigerant composition may be further improved.

In some embodiments of the present disclosure, the content of the trifluoroiodomethane (R-13I1) may range 1 to 49 wt. %, 2 to 49 wt. %, 3 to 49 wt. %, or 4 to 49 wt. % based on the total weight of the mixed refrigerant composition. Within the above content range, the thermal and chemical stabilities of the mixed refrigerant composition may be improved.

In one embodiment of the present disclosure, the content of the trifluoroiodomethane (R-13I1) may range 5 to 49 wt. %, 7 to 49 wt. %, and 9 to 49 wt. %, 10 to 49 wt. %, 15 to 49 wt. %, or 19 to 49 wt. % based on the total weight of the mixed refrigerant composition. Within the above content range, the thermal and chemical stabilities of the mixed refrigerant composition may be further improved.

In some embodiments of the present disclosure, a ratio of the content of the 2,3,3,3-tetrafluoropropene (R-1234yf) to the content of the carbon dioxide (R-744) based on the total weight of the mixed refrigerant composition may range from 3 to 90, 3 to 80, 3 to 70, 3 to 60, 3 to 50, or 3 to 40. Within the above range, the environmental friendliness and refrigeration capacity of the mixed refrigerant composition may be improved.

In one embodiment of the present disclosure, the ratio of the content of the 2,3,3,3-tetrafluoropropene (R-1234yf) to the content of the carbon dioxide (R-744) based on the total weight of the mixed refrigerant composition may range from 3 to 30, 3 to 25, 3 to 22.5, 3 to 20, 3 to 15, or 3 to 10. Within the above range, the refrigeration capacity of the mixed refrigerant composition may be further improved.

In some embodiments of the present disclosure, the ratio of the content of the trifluoroiodomethane (R-13I1) to the content of the carbon dioxide (R-744) based on the total weight of the mixed refrigerant composition may range from 0.1 to 60, 0.1 to 55, or 0.1 to 50. Within the above range, the environmental friendliness, and the thermal and chemical stabilities of the mixed refrigerant composition may be improved.

In one embodiment of the present disclosure, the ratio of the content of the trifluoroiodomethane (R-13I1) to the content of the carbon dioxide (R-744) based on the total weight of the mixed refrigerant composition may range from 0.1 to 49, 0.1 to 40, 0.1 to 30, 0.1 to 20, 0.1 to 15, or 0.1 to 10. Within the above range, the thermal and chemical stabilities of the mixed refrigerant composition may be further improved.

In some embodiments of the present disclosure, a ratio of the content of the 2,3,3,3-tetrafluoropropene (R-1234yf) to the content of the trifluoroiodomethane (R-13I1) based on the total weight of the mixed refrigerant composition may range from 0.5 to 98, 0.5 to 70, 0.5 to 50, 0.5 to 30, 0.5 to 20, 0.5 to 15, or 0.5 to 12.5. Within the above range, the thermal and chemical stabilities, and the refrigeration capacity of the mixed refrigerant composition may be improved.

In one embodiment of the present disclosure, the ratio of the content of the 2,3,3,3-tetrafluoropropene (R-1234yf) to the content of the trifluoroiodomethane (R-13I1) based on the total weight of the mixed refrigerant composition may range from 0.5 to 10, 0.5 to 9, 0.5 to 7, 0.5 to 5, 0.5 to 4, or 0.5 to 3. Within the above range, the thermal and chemical stabilities, and the refrigeration capacity of the mixed refrigerant composition may be further improved.

According to various embodiments of the present disclosure, a boiling point at 1 atm of the mixed refrigerant composition may range from −76 to −35° C., −70 to −35° C., −65 to −35° C., or −60 to −35° C.

If the boiling point of the mixed refrigerant composition is less than −76° C., a condensation pressure at the condensation temperature of the mixed refrigerant composition may be increased. Therefore, energy consumed in the refrigeration cycle may be increased, such that an efficiency of the refrigerant may be decreased.

If the boiling point of the mixed refrigerant composition exceeds −35° C., a specific volume at the condensation temperature of the mixed refrigerant composition may be increased. Accordingly, an amount of the mixed refrigerant composition required to improve refrigeration capacity is increased, such that a volume of an air conditioner may be increased.

In some embodiments of the present disclosure, the boiling point at 1 atm of the mixed refrigerant composition may range from −60 to −40° C., −60 to −45° C., or −55 to −45° C. Within the above boiling point range of the mixed refrigerant composition, the specific volume may be decreased without increasing the condensation pressure. Therefore, the refrigeration capacity of the refrigerant may be improved while reducing the amount of mixed refrigerant composition.

In some embodiments of the present disclosure, a critical temperature of the mixed refrigerant composition may range from 95 to 110° C., 95 to 107° C., 95 to 105° C., or 95 to 100° C. The critical temperature refers to a maximum temperature at which a specific substance may exist in a liquid state. If the critical temperature of the refrigerant is low, it may be difficult to liquefy the refrigerant in the refrigeration cycle.

Within the above critical temperature range, the mixed refrigerant composition may not become a supercritical fluid state in the refrigeration cycle. Therefore, it is possible to prevent a portion of the mixed refrigerant composition from reaching the supercritical fluid state to be not liquefied, and thus the refrigeration capacity may be improved.

In some embodiments of the present disclosure, a critical pressure of the mixed refrigerant composition may range from 35 to 55 bar, 35 to 50 bar, 35 to 45 bar, 38 to 45 bar, or 38 to 42 bar. The critical pressure refers to a maximum pressure at which a specific substance may exist in a liquid state. If the critical pressure of the refrigerant is high, it may be difficult to liquefy the refrigerant in the refrigeration cycle.

Within the above critical pressure range, the mixed refrigerant composition may not become the supercritical fluid state in the refrigeration cycle. Therefore, it is possible to prevent a portion of the mixed refrigerant composition from not being liquefied, and thus the refrigeration capacity may be improved.

In some embodiments of the present disclosure, a temperature glide at a pressure of 1.5 bar of the mixed refrigerant composition may range from 5 to 45° C., 5 to 40° C., 7 to 40° C., 7 to 30° C., 10 to 30° C., 10 to 25° C., 15 to 25° C., or 15 to 20° C. Temperature glide refers to the difference between the saturated vapor temperature and saturated liquid temperature of a refrigerant at a constant pressure. Within the above temperature glide range, composition separation may not occur even if the mixed refrigerant leaks out. Accordingly, a use capacity of the mixed refrigerant composition may be improved even if a heat pump having the same volume is used.

In some embodiments of the present disclosure, the temperature glide at a pressure of 15 bar of the mixed refrigerant composition may range from 1 to 40° C., 1 to 30° C., 1 to 26° C., 2 to 26° C., 5 to 26° C., 5 to 20° C., or 8 to 20° C. Within the above temperature glide range, composition separation may not occur even if the mixed refrigerant composition is used in a heat pump. Accordingly, the heat transfer efficiency of the refrigerant may be improved.

In some embodiments of the present disclosure, a latent heat at −25° C. of the mixed refrigerant composition may range from 100 to 200 kJ/kg, 110 to 200 kJ/kg, 110 to 190 kJ/kg, 110 to 180 kJ/kg, 120 to 180 kJ/kg, 130 to 180 kJ/kg, 140 to 180 kJ/kg, or 150 to 180 kJ/kg.

Within the above latent heat range, the heat released or absorbed during the phase change of the mixed refrigerant composition may be sufficient. Accordingly, the thermal efficiency of the mixed refrigerant composition may be improved.

In some embodiments of the present disclosure, the global warming potential (GWP) of the mixed refrigerant composition may range from 1 to 5, 1 to 4, 1 to 3, 1 to 2, or 1.

The global warming potential (GWP) is a value obtained by calculating a degree of effect on global warming using carbon dioxide ($CO_2$) as a reference material over a certain period of time (for example, 100 years), when 1 kg of any chemical substance is released into the Earth's troposphere.

Within the above global warming potential range, environmental pollution caused by use and treatment of the mixed refrigerant composition may be suppressed.

In some embodiments of the present disclosure, the ozone depleting potential (ODP) of the mixed refrigerant composition may be 0.

The ozone depleting potential (ODP) is a value obtained by calculating a degree of effect on ozone layer destruction by any chemical substance, when assuming that the effect of trichlorofluoromethane (CFC-11) on the ozone layer destruction is 1.

As the ozone depleting potential (ODP) is 0, environmental pollution caused by use and treatment of the mixed refrigerant composition may be suppressed.

In some embodiments of the present disclosure, the mixed refrigerant composition may be non-flammable. For example, the mixed refrigerant composition may have a flammability of Class A2L in the refrigerant safety group classification of the American Society of Heating, Refrigerating and Air-Conditioning Engineers (ASHRAE). Accordingly, stability during operation and leakage of the heat pump may be improved.

According to various embodiments of the present disclosure, the heat pump includes the mixed refrigerant composition(s) described above. Accordingly, the refrigeration performance of the heat pump may be enhanced, while improving the environmental friendliness and stability.

The heat pump may include a compressor, a condenser, an expansion valve and an evaporator. In the compressor, the above-described mixed refrigerant composition(s) may be compressed to a high temperature and high pressure state, and in the expansion valve, the above-described mixed refrigerant composition may be expanded to a low temperature and low pressure state.

For example, the above-described mixed refrigerant composition(s) may emit or absorb heat while circulating through the compressor, the condenser, the expansion valve, and the evaporator inside the heat pump. The mixed refrigerant composition may be maintained in a gaseous state at high temperature and high pressure in the compressor. The mixed refrigerant composition may be liquefied into a liquid state by releasing the heat in the condenser. The mixed refrigerant composition may be maintained in a low-temperature and low-pressure liquid state, or a mixture state of liquid and gas in the expansion valve. The mixed refrigerant composition may absorb the heat to be vaporized into a gaseous state in the evaporator.

In some embodiments, the heat pump may contain oil. For example, the oil may include paraffin, naphthene, aromatic hydrocarbon, polyester (POE), polyol ester, mineral oil, alkylbenzene (AB), and polyalkylene glycol (PAG), polyvinyl ether (PVE) and the like. Accordingly, friction and wear of the heat pump may be prevented.

In some embodiments of the present disclosure, a coefficient of performance (COP) of the heat pump may be 1 to 10. The coefficient of performance (COP) refers to a ratio of an amount of heat effectively gained to an amount of work input when operating the heat pump.

A highly efficient heat pump having the coefficient of performance in the above range may be provided using the above-described refrigerant.

Hereinafter, experimental examples including specific examples and comparative examples are provided to facilitate understanding of the present disclosure. However, the following examples are only given for illustrating the present disclosure, and those skilled in the art will understand that various alterations and modifications are possible within the scope of the present disclosure.

EXAMPLES AND COMPARATIVE EXAMPLES (1) Mixed Refrigerant Composition

Mixed refrigerant compositions having the components and contents (wt. %) shown in Table 1 below were prepared.

The boiling point, critical temperature, critical pressure, temperature glide at 1.5 bar and 15 bar, and latent heat at −25° C. of each of the prepared mixed refrigerant compositions were measured. The measured boiling points, critical temperatures, critical pressure, temperature glides at 1.5 bar and 15 bar, and latent heats at −25° C. of the mixed refrigerant compositions are shown in Table 1.

The boiling point, critical temperature, critical pressure, temperature glide, and latent heat of the mixed refrigerant composition were measured using REFPROP (Version 10, NIST).

TABLE 1

| Item | Content of each component of mixed refrigerant composition (wt. %) | | | Boiling point (° C.) | Critical temperature (° C.) | Critical pressure (bar) | Temperature glide | | Latent heat at −25° C. (kJ/kg) |
|---|---|---|---|---|---|---|---|---|---|
| | R-744 | R-1234yf | R-13I1 | | | | at 1.5 bar (° C.) | at 15 bar (° C.) | |
| Example 1 | 1 | 40 | 59 | −39.9 | 101.7 | 38.0 | 9.1 | 5.0 | 132.4 |
| Example 2 | 1 | 50 | 49 | −39.2 | 99.4 | 37.4 | 7.7 | 4.1 | 139.8 |
| Example 3 | 1 | 60 | 39 | −38.5 | 97.7 | 36.8 | 6.8 | 3.5 | 147.4 |
| Example 4 | 1 | 90 | 9 | −36.6 | 95.7 | 35.9 | 5.5 | 2.7 | 171.6 |
| Example 5 | 2 | 40 | 58 | −48.2 | 101.1 | 39.9 | 16.4 | 9.6 | 134.2 |
| Example 6 | 2 | 50 | 48 | −46.7 | 99.2 | 39.2 | 14.4 | 8.2 | 141.6 |
| Example 7 | 2 | 60 | 38 | −45.5 | 97.9 | 38.7 | 12.9 | 7.2 | 149.3 |
| Example 8 | 2 | 90 | 8 | −42.2 | 96.3 | 37.7 | 10.4 | 5.5 | 173.6 |
| Example 9 | 3 | 30 | 67 | −56.9 | 102.9 | 42.5 | 25.6 | 16.6 | 128.8 |
| Example 10 | 3 | 40 | 57 | −54.7 | 100.5 | 41.7 | 22.3 | 14.1 | 136.0 |
| Example 11 | 3 | 50 | 47 | −52.8 | 98.9 | 41.0 | 19.8 | 12.2 | 143.5 |
| Example 12 | 3 | 60 | 37 | −51.2 | 97.8 | 40.5 | 18.0 | 10.9 | 151.2 |
| Example 13 | 3 | 90 | 7 | −46.9 | 96.6 | 39.4 | 14.5 | 8.2 | 175.7 |
| Example 14 | 4 | 40 | 56 | −59.7 | 99.9 | 43.5 | 26.7 | 18.4 | 137.8 |
| Example 15 | 4 | 50 | 46 | −57.7 | 98.5 | 42.8 | 24.1 | 16.1 | 145.3 |
| Example 16 | 4 | 60 | 36 | −55.8 | 97.6 | 42.2 | 22.1 | 14.4 | 153.1 |
| Example 17 | 4 | 90 | 6 | −50.8 | 96.8 | 40.9 | 17.9 | 10.9 | 177.8 |
| Example 18 | 10 | 40 | 50 | −73.9 | 95.7 | 53.3 | 37.7 | 34.3 | 148.6 |
| Example 19 | 10 | 60 | 30 | −70.1 | 95.5 | 51.6 | 33.7 | 29.0 | 164.7 |
| Comparative Example 1 | 0 | 100 | 0 | −29.7 | 94.7 | 33.8 | 0 | 0 | 177.9 |
| Comparative Example 2 | 3 | 10 | 87 | −62.8 | 110.3 | 44.7 | 34.9 | 24 | 115.3 |
| Comparative Example 3 | 3 | 20 | 77 | −59.6 | 106.1 | 43.5 | 29.8 | 19.9 | 121.9 |
| Comparative Example 4 | 15 | 40 | 45 | −77.9 | 91.4 | 59.8 | 38.9 | 38.4 | 158.0 |
| Comparative Example 5 | 15 | 60 | 25 | −74.8 | 92.8 | 57.9 | 36.1 | 34.1 | 174.5 |

The specific components described in Table 1 are as follows.
R-744: Carbon dioxide
R-1234yf: 2,3,3,3-tetrafluoropropene
R-13I1: Trifluoroiodomethane Experiment Example (1) GWP Calculation Based on the global warming potential (GWP) according to the Intergovernmental Panel on Climate Change (IPCC) of R-744, R-1234yf and R-13I1 included in the mixed refrigerant composition according to the embodiments of the present disclosure, the global warming potentials (GWPs) of the mixed refrigerant compositions were calculated by calculating an arithmetic mean according to the weight ratio of each of R-744, R-1234yf and R-13I1.

The global warming potential (GWP) according to the IPCC was based on the global warming potential (GWP) on the basis of 100 years.

The calculated global warming potentials (GWPs) are shown in Table 2 below.

TABLE 2

| Item | Global warming potential (GWP) |
|---|---|
| Example 1 | 1.0 |
| Example 2 | 1.0 |
| Example 3 | 1.0 |
| Example 4 | 1.0 |
| Example 5 | 1.0 |
| Example 6 | 1.0 |
| Example 7 | 1.0 |
| Example 8 | 1.0 |
| Example 9 | 1.0 |
| Example 10 | 1.0 |
| Example 11 | 1.0 |
| Example 12 | 1.0 |
| Example 13 | 1.0 |
| Example 14 | 1.0 |
| Example 15 | 1.0 |
| Example 16 | 1.0 |
| Example 17 | 1.0 |
| Example 18 | 1.0 |
| Example 19 | 1.0 |
| Comparative Example 1 | 1.0 |
| Comparative Example 2 | 1.0 |
| Comparative Example 3 | 1.0 |
| Comparative Example 4 | 1.0 |
| Comparative Example 5 | 1.0 |

(2) Cooling/Heating Evaluation

Figure 1:
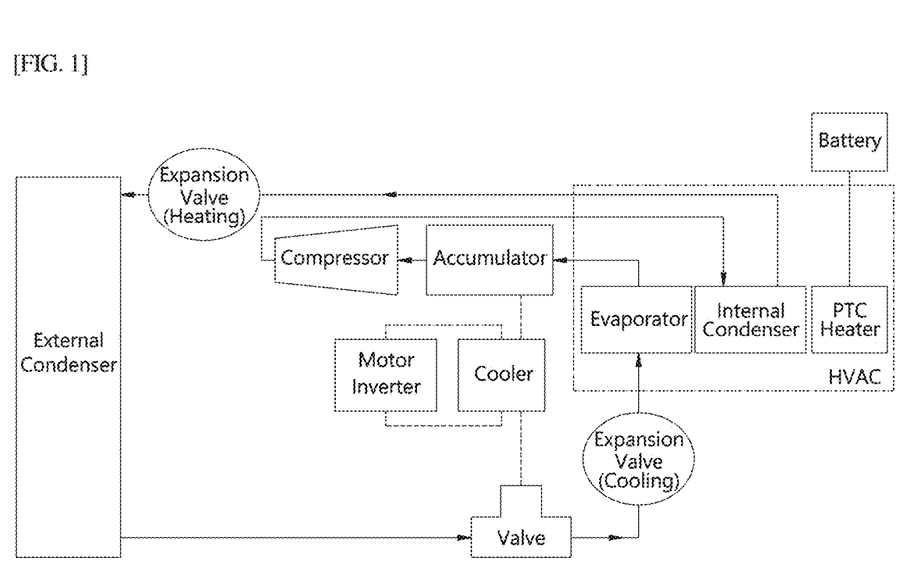
FIGS. 1 and 2 are schematic views illustrating the flow of a mixed refrigerant for heat exchange in a cooling mode or a heating mode of a heat exchanger according to various embodiments of the present disclosure, respectively.
Figure 2:
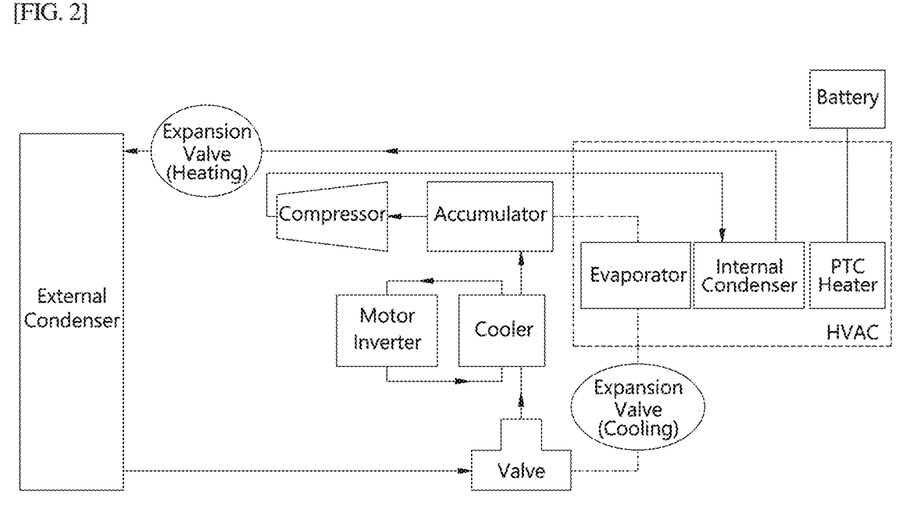

FIGS. 1 and 2 are schematic views illustrating the flow of a mixed refrigerant for heat exchange in a cooling mode or a heating mode of a heat exchanger according to various embodiments of the present disclosure, respectively.

The flow of the mixed refrigerant is shown by using directions of the arrows in FIGS. 1 and 2.

Referring to FIG. 1, in the cooling mode, the mixed refrigerant is compressed through a compressor, bypasses an internal condenser and an expansion valve (heating) in turn, releases heat in an external condenser, then expands in the expansion valve (cooling), and reabsorbs the heat through an evaporator.

Referring to FIG. 2, in the heating mode, the mixed refrigerant is compressed through the compressor, releases heat in the internal condenser, expands in the expansion valve (heating), absorbs heat from the external condenser, and then further absorbs the heat through a cooler.

Cooling evaluation and heating evaluation were performed using the refrigerant combinations of Examples 1 to 19 and Comparative Examples 1 to 5 through the above-described heat exchanger at different outside air temperatures.

The cooling evaluation was performed by setting the outside air temperature to 45° C., and the heating evaluation was performed by setting the outside air temperature to −7° C. and −20° C., respectively. Conditions for cooling evaluation and heating evaluation according to the above-described examples and comparative examples are shown in Table 3 below.

Specifically, the outside air temperature (° C.), refrigerant temperature at a condenser outlet, refrigerant supercooling degree at the condenser outlet, refrigerant temperature at an evaporator outlet, and refrigerant superheating degree at the evaporator outlet are shown in Table

TABLE 3

| Item | Operation mode | Outside air temperature (° C.) | Refrigerant temperature at condenser outlet (° C.) | Refrigerant supercooling degree at condenser outlet (° C.) | Refrigerant temperature at evaporator outlet (° C.) | Refrigerant superheating degree at evaporator outlet (° C.) |
|---|---|---|---|---|---|---|
| Example 1 | Cooling | 45 | 55 | 10 | 10 | 8 |
| Example 1 | Heating | −7 | 40 | 10 | −20 | 1 |
| Example 1 | Heating | −20 | 20 | 10 | −29 | 1 |
| Example 2 | Cooling | 45 | 55 | 10 | 10 | 8 |
| Example 2 | Heating | −7 | 40 | 10 | −20 | 1 |
| Example 2 | Heating | −20 | 20 | 10 | −29 | 1 |
| Example 3 | Cooling | 45 | 55 | 10 | 10 | 8 |
| Example 3 | Heating | −7 | 40 | 10 | −20 | 1 |
| Example 3 | Heating | −20 | 20 | 10 | −29 | 1 |
| Example 4 | Cooling | 45 | 55 | 10 | 10 | 8 |
| Example 4 | Heating | −7 | 40 | 10 | −20 | 1 |
| Example 4 | Heating | −20 | 20 | 10 | −29 | 1 |
| Example 5 | Cooling | 45 | 55 | 10 | 10 | 8 |
| Example 5 | Heating | −7 | 40 | 10 | −20 | 1 |
| Example 5 | Heating | −20 | 20 | 10 | −29 | 1 |
| Example 6 | Cooling | 45 | 55 | 10 | 10 | 8 |
| Example 6 | Heating | −7 | 40 | 10 | −20 | 1 |
| Example 6 | Heating | −20 | 20 | 10 | −29 | 1 |
| Example 7 | Cooling | 45 | 55 | 10 | 10 | 8 |
| Example 7 | Heating | −7 | 40 | 10 | −20 | 1 |
| Example 7 | Heating | −20 | 20 | 10 | −29 | 1 |
| Example 8 | Cooling | 45 | 55 | 10 | 10 | 8 |
| Example 8 | Heating | −7 | 40 | 10 | −20 | 1 |
| Example 8 | Heating | −20 | 20 | 10 | −29 | 1 |
| Example 9 | Cooling | 45 | 55 | 10 | 10 | 8 |
| Example 9 | Heating | −7 | 40 | 10 | −20 | 1 |
| Example 9 | Heating | −20 | 20 | 10 | −29 | 1 |
| Example 10 | Cooling | 45 | 55 | 10 | 10 | 8 |
| Example 10 | Heating | −7 | 40 | 10 | −20 | 1 |
| Example 10 | Heating | −20 | 20 | 10 | −29 | 1 |

TABLE 3-continued

| Item | Operation mode | Outside air temperature (° C.) | Refrigerant temperature at condenser outlet (° C.) | Refrigerant supercooling degree at condenser outlet (° C.) | Refrigerant temperature at evaporator outlet (° C.) | Refrigerant superheating degree at evaporator outlet (° C.) |
|---|---|---|---|---|---|---|
| Example 11 | Cooling | 45 | 55 | 10 | 10 | 8 |
| Example 11 | Heating | −7 | 40 | 10 | −20 | 1 |
| Example 11 | Heating | −20 | 20 | 10 | −29 | 1 |
| Example 12 | Cooling | 45 | 55 | 10 | 10 | 8 |
| Example 12 | Heating | −7 | 40 | 10 | −20 | 1 |
| Example 12 | Heating | −20 | 20 | 10 | −29 | 1 |
| Example 13 | Cooling | 45 | 55 | 10 | 10 | 8 |
| Example 13 | Heating | −7 | 40 | 10 | −20 | 1 |
| Example 13 | Heating | −20 | 20 | 10 | −29 | 1 |
| Example 14 | Cooling | 45 | 55 | 10 | 10 | 8 |
| Example 14 | Heating | −7 | 40 | 10 | −20 | 1 |
| Example 14 | Heating | −20 | 20 | 10 | −29 | 1 |
| Example 15 | Cooling | 45 | 55 | 10 | 10 | 8 |
| Example 15 | Heating | −7 | 40 | 10 | −20 | 1 |
| Example 15 | Heating | −20 | 20 | 10 | −29 | 1 |
| Example 16 | Cooling | 45 | 55 | 10 | 10 | 8 |
| Example 16 | Heating | −7 | 40 | 10 | −20 | 1 |
| Example 16 | Heating | −20 | 20 | 10 | −29 | 1 |
| Example 17 | Cooling | 45 | 55 | 10 | 10 | 8 |
| Example 17 | Heating | −7 | 40 | 10 | −20 | 1 |
| Example 17 | Heating | −20 | 20 | 10 | −29 | 1 |
| Example 18 | Cooling | 45 | 55 | 10 | 10 | 8 |
| Example 18 | Heating | −7 | 40 | 10 | −20 | 1 |
| Example 18 | Heating | −20 | 20 | 10 | −29 | 1 |
| Example 19 | Cooling | 45 | 55 | 10 | 10 | 8 |
| Example 19 | Heating | −7 | 40 | 10 | −20 | 1 |
| Example 19 | Heating | −20 | 20 | 10 | −29 | 1 |
| Comparative Example 1 | Cooling | 45 | 55 | 10 | 10 | 8 |
| Comparative Example 1 | Heating | −7 | 40 | 10 | −20 | 1 |
| Comparative Example 1 | Heating | −20 | 20 | 10 | −29 | 1 |
| Comparative Example 2 | Cooling | 45 | 55 | 10 | 10 | 8 |
| Comparative Example 2 | Heating | −7 | 40 | 10 | −20 | 1 |
| Comparative Example 2 | Heating | −20 | 20 | 10 | −29 | 1 |
| Comparative Example 3 | Cooling | 45 | 55 | 10 | 10 | 8 |
| Comparative Example 3 | Heating | −7 | 40 | 10 | −20 | 1 |
| Comparative Example 3 | Heating | −20 | 20 | 10 | −29 | 1 |
| Comparative Example 4 | Cooling | 45 | 55 | 10 | 10 | 8 |
| Comparative Example 4 | Heating | −7 | 40 | 10 | −20 | 1 |
| Comparative Example 4 | Heating | −20 | 20 | 10 | −29 | 1 |
| Comparative Example 5 | Cooling | 45 | 55 | 10 | 10 | 8 |
| Comparative Example 5 | Heating | −7 | 40 | 10 | −20 | 1 |
| Comparative Example 5 | Heating | −20 | 20 | 10 | −29 | 1 |

Cooling and heating analysis for the examples and comparative examples shown in Table 3 were verified through the zero-dimensional GD analysis program Cycle-D (provided by NIST). Specifically, volumetric capacity, temperature and pressure at the compressor outlet were evaluated through the cooling and heating analysis.

The volumetric capacity was calculated using Equation 1 below.

$$\text{Volumetric capacity} = \frac{\text{Cooling performance (or heating performance) per unit mass}}{\text{Refrigerant specific volume}} \times \text{Compressor volumetric efficiency} \quad [\text{Equation 1}]$$

Evaluation results are shown in Tables 4 to 6 below.

TABLE 4

Cooling evaluation (Outside air temperature: 45° C.)

| Item | Volumetric capacity (kJ/m³) | Pressure at compressor outlet (kPaA) | Temperature at compressor outlet (° C.) |
|---|---|---|---|
| Example 1 | 2609.8 | 1597.7 | 79.8 |
| Example 2 | 2664.6 | 1611.6 | 76.9 |
| Example 3 | 2690.9 | 1618.1 | 74.8 |
| Example 4 | 2663.8 | 1604.0 | 70.9 |
| Example 5 | 2655.6 | 1805.5 | 85.2 |
| Example 6 | 2709.4 | 1801.0 | 81.6 |
| Example 7 | 2733.6 | 1792.3 | 79.0 |
| Example 8 | 2700.2 | 1741.2 | 74.1 |
| Example 9 | 2556.0 | 2041.4 | 95.9 |
| Example 10 | 2701.7 | 2019.2 | 90.3 |
| Example 11 | 2754.0 | 1996.1 | 86.2 |
| Example 12 | 2776.2 | 1971.3 | 83.1 |
| Example 13 | 2736.3 | 1878.9 | 77.1 |
| Example 14 | 2747.7 | 2233.7 | 95.0 |
| Example 15 | 2798.7 | 2192.2 | 90.3 |
| Example 16 | 2818.6 | 2151.1 | 86.8 |
| Example 17 | 2772.4 | 2015.7 | 79.9 |
| Example 18 | 2959.6 | 3399.1 | 114.5 |
| Example 19 | 3001.2 | 3145.8 | 103.5 |
| Comparative Example 1 | 2545.5 | 1464.7 | 67.0 |
| Comparative Example 2 | 2368.8 | 2080.4 | 113.4 |
| Comparative Example 3 | 2445.4 | 2062.6 | 103.5 |
| Comparative Example 4 | 2080.4 | 4167.7 | 123.5 |
| Comparative Example 5 | 2062.6 | 3831.5 | 112.1 |

TABLE 5

Heating evaluation (Outside air temperature: −7° C.)

| Item | Volumetric capacity (kJ/m³) | Pressure at compressor outlet (kPaA) | Temperature at compressor outlet (° C.) |
|---|---|---|---|
| Example 1 | 1412.4 | 1149.0 | 68.1 |
| Example 2 | 1433.6 | 1154.8 | 64.2 |
| Example 3 | 1437.6 | 1156.0 | 61.3 |
| Example 4 | 1393.0 | 1137.6 | 55.9 |
| Example 5 | 1473.5 | 1327.3 | 74.8 |
| Example 6 | 1490.4 | 1317.0 | 70.0 |
| Example 7 | 1491.0 | 1304.9 | 66.5 |
| Example 8 | 1435.7 | 1254.4 | 59.9 |
| Example 9 | 1477.4 | 1539.0 | 88.1 |
| Example 10 | 1533.3 | 1510.7 | 80.9 |
| Example 11 | 1547.3 | 1484.1 | 75.5 |
| Example 12 | 1543.2 | 1458.0 | 71.4 |
| Example 13 | 1476.9 | 1371.3 | 63.6 |
| Example 14 | 1591.8 | 1694.3 | 86.4 |
| Example 15 | 1602.4 | 1651.6 | 80.4 |
| Example 16 | 1594.7 | 1611.2 | 75.9 |
| Example 17 | 1517.8 | 1487.2 | 67.1 |
| Example 18 | 1896.4 | 2675.1 | 110.0 |
| Example 19 | 1856.5 | 2446.1 | 96.1 |
| Comparative Example 1 | 1309.4 | 1018.4 | 50.8 |
| Comparative Example 2 | 1392.8 | 1601.3 | 111.0 |
| Comparative Example 3 | 1430.0 | 1569.7 | 97.9 |
| Comparative Example 4 | 2161.7 | 3304.9 | 121.5 |
| Comparative Example 5 | 2085.0 | 3009.2 | 107.0 |

TABLE 6

Heating evaluation (Outside air temperature: −20° C.)

| Item | Volumetric capacity (kJ/m³) | Pressure at compressor outlet (kPaA) | Temperature at compressor outlet (° C.) |
|---|---|---|---|
| Example 1 | 1085.6 | 704.9 | 50.8 |
| Example 2 | 1106.4 | 704.4 | 46.9 |
| Example 3 | 1112.2 | 701.8 | 44.0 |
| Example 4 | 1080.8 | 682.9 | 38.9 |
| Example 5 | 1137.3 | 842.5 | 58.6 |
| Example 6 | 1154.6 | 829.1 | 53.7 |
| Example 7 | 1157.1 | 816.0 | 50.1 |
| Example 8 | 1116.3 | 771.7 | 43.6 |
| Example 9 | 1139.8 | 1013.8 | 73.2 |
| Example 10 | 1187.0 | 983.8 | 65.5 |
| Example 11 | 1201.6 | 957.3 | 59.9 |
| Example 12 | 1200.8 | 933.0 | 55.8 |
| Example 13 | 1150.2 | 860.2 | 47.8 |
| Example 14 | 1235.4 | 1124.3 | 71.7 |
| Example 15 | 1246.8 | 1085.0 | 65.4 |
| Example 16 | 1243.0 | 1049.5 | 60.8 |
| Example 17 | 1183.3 | 947.5 | 51.7 |
| Example 18 | 1480.4 | 1855.8 | 96.6 |
| Example 19 | 1453.6 | 1670.7 | 82.4 |
| Comparative Example 1 | 1014.9 | 591.7 | 32.9 |
| Comparative Example 2 | 1060.0 | 1088.4 | 97.1 |
| Comparative Example 3 | 1096.7 | 1048.7 | 83.4 |
| Comparative Example 4 | 1689.0 | 2306.2 | 108.3 |
| Comparative Example 5 | 1632.4 | 2076.2 | 93.6 |

Referring to Table 4, in the examples within the scope of the present disclosure, the volumetric capacity in the cooling evaluation (outside air temperature of 45° C.) was 2556.0 kJ/m or more, and the temperature at the compressor outlet was 114.5° C. or lower.

The volumetric capacity is an amount of energy that the refrigerant can include per unit volume. The larger the volumetric capacity, the lager the amount of energy that the same volume of refrigerant can move, thus it is a refrigerant with good air conditioning performance.

In the case of Example 4 including R-1234yf in an amount of 90 wt. % and Comparative Example 1 using R-1234yf alone, the volumetric capacity was decreased compared to Examples 1 to 3 including R-1234yf in a range of less than 90 wt. %.

Referring to Comparative Examples 2 and 3, when including R-1234yf in an amount of 10 wt. % or 20 wt. %, the volumetric capacity was decreased compared to other examples including R-1234yf in a range of 30 wt. % or more.

Referring to the examples, it shown a tendency for the volumetric capacity to be increased as the content of R-744 is increased. However, referring to Comparative Examples 4 and 5, when including R-744 in an amount of 15 wt. %, these comparative examples showed a tendency for the pressure and temperature at the compressor outlet to be increased compared to other examples including R-744 in a range of 10 wt. % or less.

Referring to Table 5, in the examples within the scope of the present disclosure, the volumetric capacity in the heating evaluation (outside air temperature of −7° C.) was 1393.0 kJ/m$^3$ or more, and the temperature at the compressor outlet was 110.0° C. or lower.

In the case of Example 4 including R-1234yf in an amount of 90 wt. % and Comparative Example 1 using R-1234yf alone, the volumetric capacity was decreased compared to Examples 1 to 3 including R-1234yf in a range of less than 90 wt. %.

Referring to Comparative Examples 2 and 3, when including R-1234yf in an amount of 10 wt. % or 20 wt. %, the volumetric capacity was decreased compared to other examples including R-1234yf in a range of 30 wt. % or more.

Referring to the examples, it shown a tendency for the volumetric capacity to be increased as the content of R-744 is increased. However, referring to Comparative Examples 4 and 5, when including R-744 in a range of 15 wt. %, these comparative examples showed a tendency for the pressure and temperature at the compressor outlet to be increased compared to other examples including R-744 in a range of 10 wt. % or less.

Referring to Table 6, in the examples within the scope of the present disclosure, the volumetric capacity in the heating evaluation (outside air temperature of −20° C.) was 1080.8 kJ/m$^3$ or more, and the temperature at the compressor outlet was 96.6° C. or lower.

In the case of Example 4 including R-1234yf in an amount of 90 wt. % and Comparative Example 1 using R-1234yf alone, the volumetric capacity was decreased compared to Examples 1 to 3 including R-1234yf in a range of less than 90 wt. %.

Referring to Comparative Examples 2 and 3, when including R-1234yf in an amount of 10 wt. % or 20 wt. %, the volumetric capacity was decreased compared to other examples including R-1234yf in a range of 30 wt. % or more.

Referring to the examples, the examples show a tendency for the volumetric capacity to be increased as the content of R-744 is increased. However, referring to Comparative Examples 4 and 5, when including R-744 in a range of 15 wt. %, these comparative examples showed a tendency for the pressure and temperature at the compressor outlet to be increased compared to other examples including R-744 in a range of 10 wt. % or less.

Referring to the results shown in Tables 4 to 6, one embodiment of the present disclosure utilizes the mixed refrigerant including all of R-744, R-1234yf and R-13I1 rather than the case of using a refrigerant including R-1234yf alone. In addition, one embodiment of the present disclosure limits the maximum content of R-744 to 10 wt. % based on the total weight of the mixed refrigerant composition.

What is claimed is:

1. A mixed refrigerant composition comprising:
   carbon dioxide, 2,3,3,3-tetrafluoropropene and trifluoroiodomethane,
   wherein a content of the carbon dioxide ranges from 1 to 10% by weight based on a total weight of the mixed refrigerant composition,
   a sum of a content of the 2,3,3,3-tetrafluoropropene and a content of the trifluoroiodomethane ranges from 90 to 99% by weight based on the total weight of the mixed refrigerant composition,
   the content of the 2,3,3,3-tetrafluoropropene based on the total weight of the mixed refrigerant composition is greater than the content of the trifluoroiodomethane, and
   a boiling point for the mixed refrigerant composition at 1 atm ranges from −76 to −35° C.

2. The mixed refrigerant composition according to claim 1, wherein the mixed refrigerant composition consists of the carbon dioxide, the 2,3,3,3-tetrafluoropropene and the trifluoroiodomethane.

3. The mixed refrigerant composition according to claim 1, wherein the content of the 2,3,3,3-tetrafluoropropene ranges from 45 to 95% by weight based on the total weight of the mixed refrigerant composition.

4. The mixed refrigerant composition according to claim 1, wherein the content of the trifluoroiodomethane ranges from 5 to 49% by weight based on the total weight of the mixed refrigerant composition.

5. The mixed refrigerant composition according to claim 1, wherein a ratio of the content of the 2,3,3,3-tetrafluoropropene to the content of the carbon dioxide based on the total weight of the mixed refrigerant composition ranges from 3 to 90.

6. The mixed refrigerant composition according to claim 1, wherein a ratio of the content of the trifluoroiodomethane based on the total weight of the mixed refrigerant composition to the content of the carbon dioxide based on the total weight of the mixed refrigerant composition ranges from 0.1 to 60.

7. The mixed refrigerant composition according to claim 1, wherein a critical temperature of the mixed refrigerant composition ranges from 95 to 110° C.

8. The mixed refrigerant composition according to claim 1, wherein a critical pressure of the mixed refrigerant composition ranges from 35 to 55 bar.

9. The mixed refrigerant composition according to claim 1, wherein a temperature glide at a pressure of 1.5 bar of the mixed refrigerant composition ranges from 5 to 45° C.

10. The mixed refrigerant composition according to claim 1, wherein a temperature glide at a pressure of 15 bar of the mixed refrigerant composition ranges from 1 to 40° C.

11. The mixed refrigerant composition according to claim 1, wherein a latent heat at −25° C. of the mixed refrigerant composition ranges from 100 to 200 KJ/kg.

12. The mixed refrigerant composition according to claim 1, wherein a global warming potential of the mixed refrigerant composition ranges from 1 to 5.

13. A heat pump comprising the mixed refrigerant composition according to claim 1.

* * * * *